United States Patent [19]
Naito et al.

[11] 3,886,138
[45] May 27, 1975

[54] 4'-DEOXYKANAMYCIN A

[75] Inventors: Takayuki Naito; Susumu Nakagawa; Yoshio Abe, all of Tokyo, Japan

[73] Assignee: Bristol-Myers Company, New York, N.Y.

[22] Filed: Dec. 21, 1973

[21] Appl. No.: 427,199

[52] U.S. Cl............................. 260/210 K; 424/180
[51] Int. Cl............................................. C07c 47/18
[58] Field of Search................... 260/210 K, 210 AB

[56] References Cited
UNITED STATES PATENTS
3,753,973   8/1973   Umezawa et al............. 260/210 AB FOREIGN PATENTS OR APPLICATIONS
864,831   4/1961   United Kingdom.......... 260/210 AK
933,702   11/1959   United Kingdom............. 260/210 K Primary Examiner—Johnnie R. Brown
Assistant Examiner—Cary B. Owens
Attorney, Agent, or Firm—Robert E. Havranek

[57] ABSTRACT

4'-Deoxykanamycin A, which is prepared from kanamycin A, possesses improved anti-pseudomonas activity as compared to kanamycin A.

2 Claims, No Drawings

4'-DEOXYKANAMYCIN A

BACKGROUND OF THE INVENTION

1. Field of the Invention

This invention relates to a semi-synthetic derivative of kanamycin A, said compound being prepared by dehydroxylation of the 4'-position of kanamycin A.

2. Description of the Prior Art

The kanamycins are known antibiotics described in Merck Index, 8th Edition, pp. 597–598. Kanamycin A is a compound having the formula

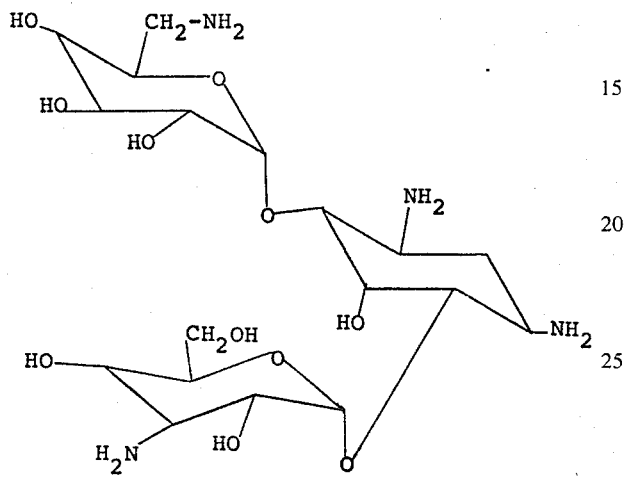

SUMMARY OF THE INVENTION

The compound having the formula

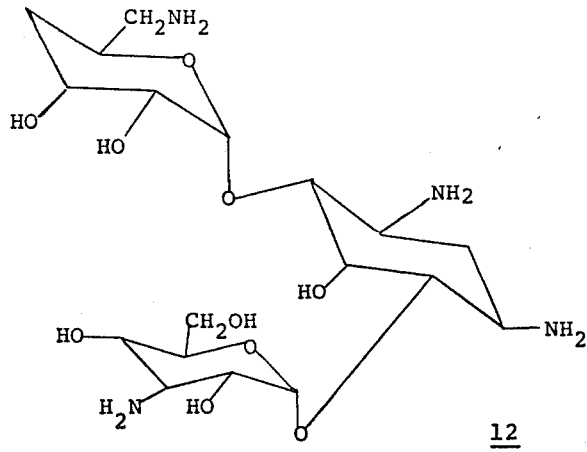

or a nontoxic pharmaceutically acceptable acid addition salt thereof is a valuable antibacterial agent.

This invention relates to a semi-synthetic derivative of kanamycin A, said compound being known as 4'-deoxykanamycin A and having the formula

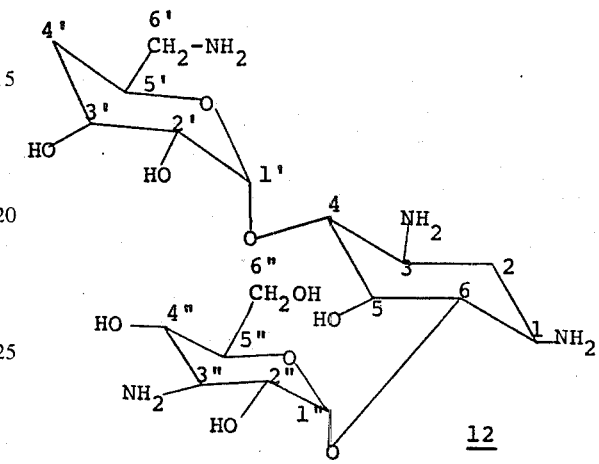

or a nontoxic pharmaceutically acceptable acid addition salt thereof.

For the purpose of this disclosure, the term "nontoxic pharmaceutically acceptable acid addition salt" shall mean a mono, di-, tri- or tetrasalt formed by the interaction of 1 molecule of compound 12 with 1–4 moles of a nontoxic, pharmaceutically acceptable acid. Included among these acids are acetic, hydrochloric, sulfuric, maleic, phosphoric, nitric, hydrobromic, ascorbic, malic and citric acid, and those other acids commonly used to make salts of amine containing pharmaceuticals.

The compounds of the present invention are prepared by the following diagramatic schemes 1 or 2:

Scheme 1. Preparation of 4'-deoxykanamycin by Route A. (figures in parentheses indicate an overall yield from 6'-Cbz-KMA).

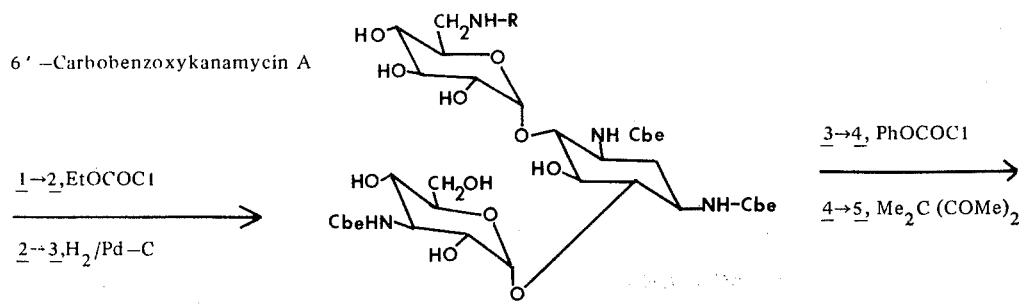

2: R=Cbz, Y. 93%
3: R=H, Y. 100% (93%)

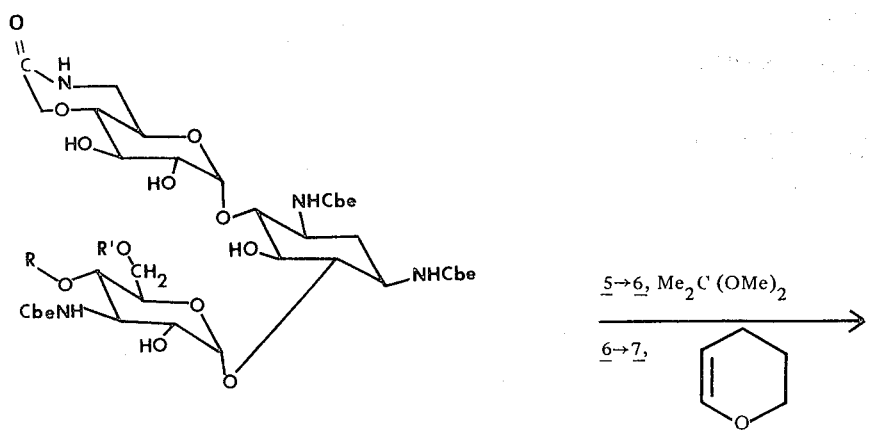
4: R=H, R'=H; Y. 93% (86.5%)
5: R–, R'– = C(Me)₂; Y. 88% (76.1%)
$5 \rightarrow 6$, Me₂C(OMe)₂
$6 \rightarrow 7$, [dihydropyran]
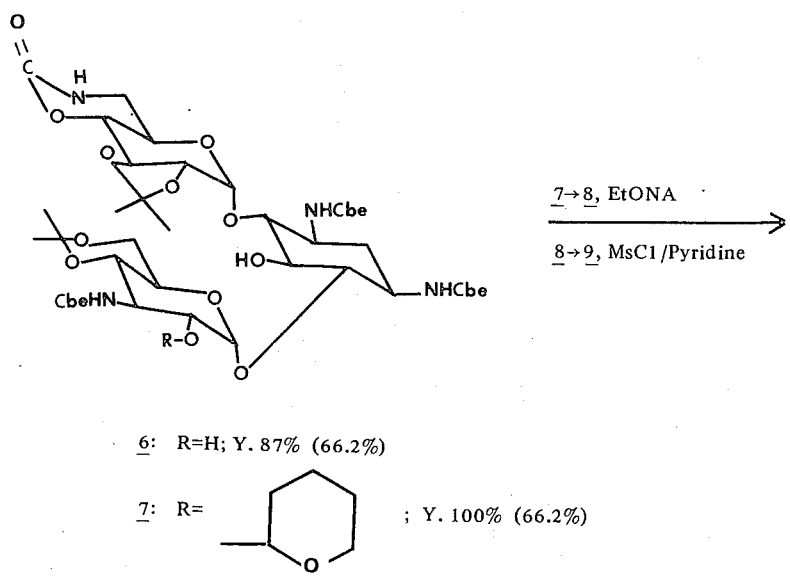
6: R=H; Y. 87% (66.2%)
7: R= [tetrahydropyranyl] ; Y. 100% (66.2%)
$7 \rightarrow 8$, EtONa
$8 \rightarrow 9$, MsCl/Pyridine
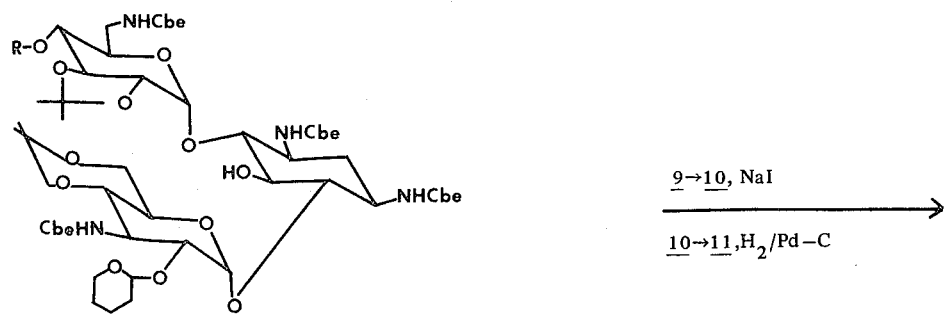
8: R=H; Y. 57% (37.7%)
9: R=SO₂CH₃; Y. 90% (34.0%)
$9 \rightarrow 10$, NaI
$10 \rightarrow 11$, H₂/Pd–C

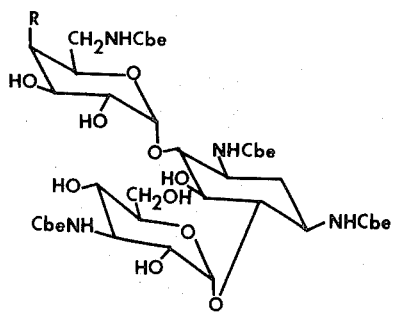 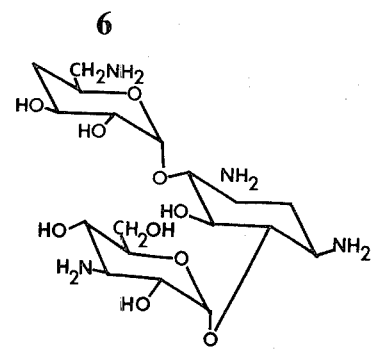
10: R=I; Y. 72% (24.5%)
11: R=H; Y. 100% (24.5%)
12, BB-K 156
Cbe is a radical of the formula $-\overset{\overset{O}{\|}}{C}-O-C_2H_5$.
6'-Cbz-KMA is 6'-carbobenzoxykanamycin A.
MsCl is mesyl chloride.
Scheme 2. Preparation of 4'-deoxykanamycin A by Route B. (figures in parenthese indicate an overall yield from 6'-Cbz-KMA)
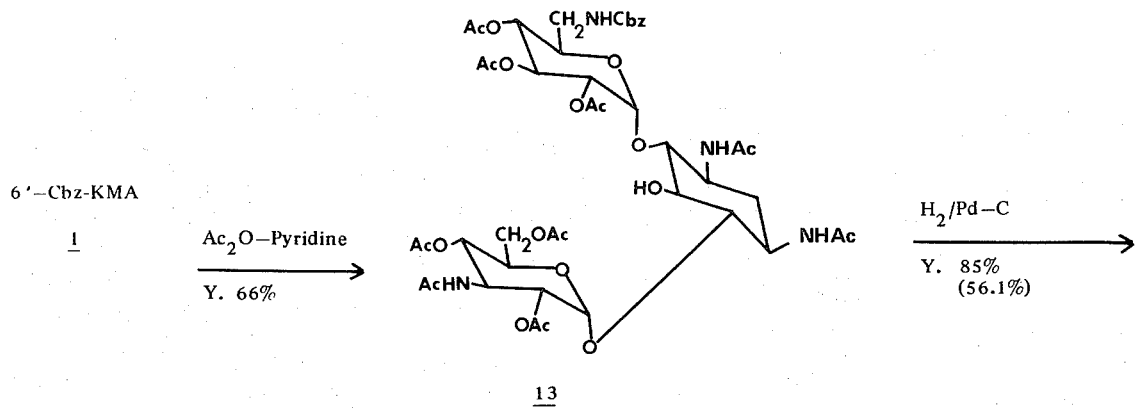
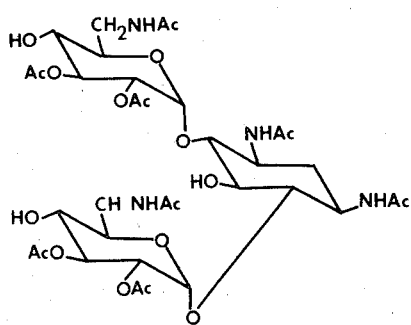 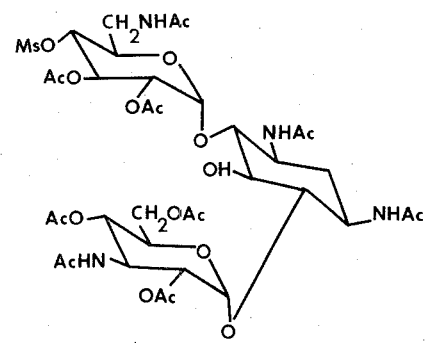
14
15

Y. 23%
(8.3%)

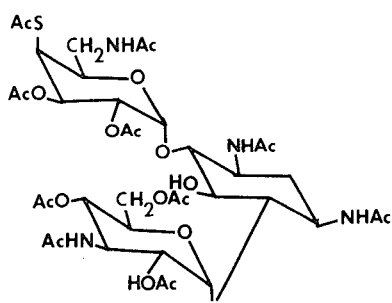

1. Raney Ni
2. (NH$_2$)$_2$

Y. 18%
(1.5%)

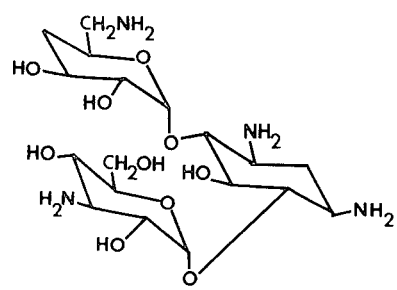

12, BB–K 156

16

A preferred embodiment of the present invention is the compound having the formula

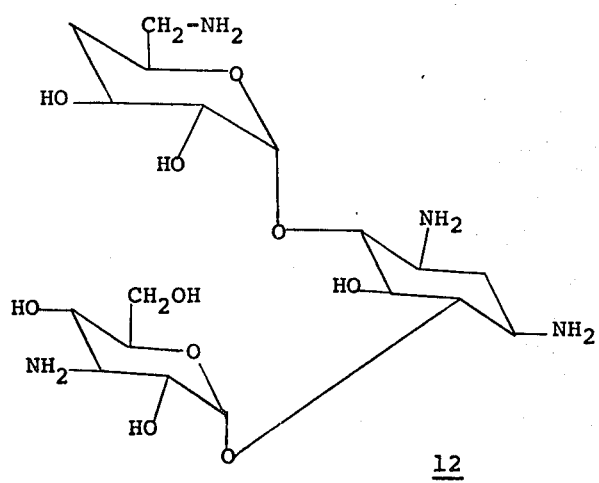

12

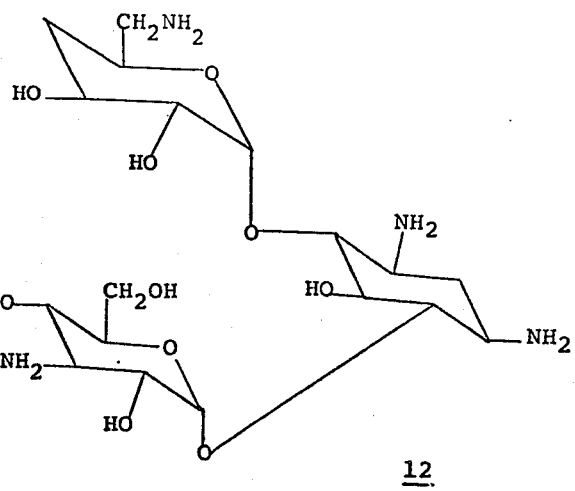

12 or a pharmaceutically acceptable nontoxic salt thereof.

A most preferred embodiment is the mono- or disulfate salt of the compound 12.

A most preferred embodiment is the mono- or polyhydrate of the compound 12.

A most preferred embodiment is the mono- or polyhydrate of the disulfate salt of compound 12.

The objectives of the present invention have been achieved, by the provision according to the present invention of the process for the preparation of the compound having the formula which process comprises the consecutive steps of
A. treating the compound having the formula

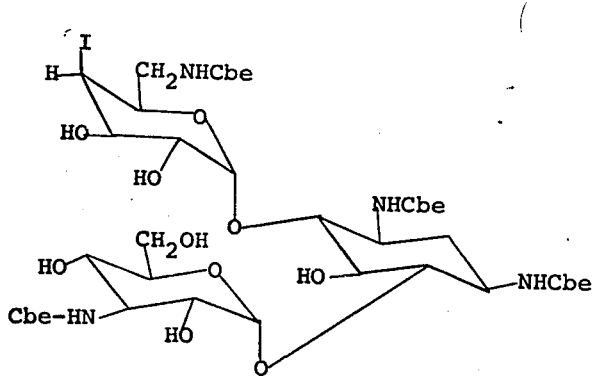

10 in which Cbe is

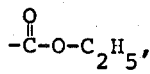

with at least 1 mole of triethylamine and hydrogen in the presence of 10% palladium on charcoal at room temperature in water-tetrahydrofuran to produce the compound having the formula

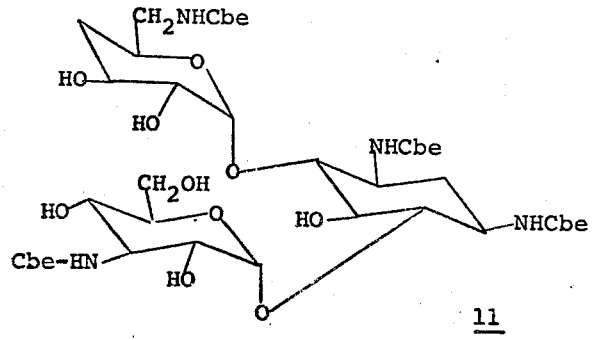

in which Cbe is

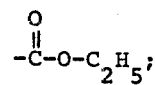

and

B. treating compound 11 with barium hydroxide octahydrate in water-dioxane (5:4) at reflux temperatures for at least 4 hours, followed by purification by chromatography.

Compound 12, 4'-deoxykanamycin A, possesses good antibacterial activity that in some respects is superior to kanamycin A itself. Illustrated below is a table showing the minimal inhibitory concentrations (MIC's) of kanamycin A and compound 12 (BB-K156) against a variety of gram-positive and gram-negative bacteria as obtained by the Steers agar-dilution method.

The minimal inhibitory concentrations of BB-K 156 (4'-deoxykanamycin A)
(Steer's agar dilution procedure, Mueller-Hinton medium)

|  | Organism |  | MIC (mcg/ml) BB-K 156 | MIC (mcg/ml) Kanamycin A | MIC ratio kanamycin A BB-K156 |
|---|---|---|---|---|---|
| Ec-1 | *E. coli* NIHJ |  | 3.1 | 1.6 | ½ |
| Ec-3 | " Juhl | A15119 | 6.3 | 3.1 | ½ |
| Ec-5 | " K-12 ML-1630 | A20363 | 100 | >100 | >1 |
| Ec-7 | " (KM-R) | A20365 | 12.5 | >100 | >8 |
| Ec-8 | " K-12 | A9632 | 3.1 | 3.1 | 1 |
| Ec-9 | " NR79/W677 | A20664 | 25 | 12.5 | ½ |
| Ec-10 | " JR35/C600 | A20665 | 100 | >100 | >1 |
| Ec-52 | " W677 | A20684 | 6.3 | 1.6 | ¼ |
| Ec-53 | " JR66/W677 | A20683 | >100 | >100 | — |
| Ec-59 |  | A20766 | 100 | >100 | >1 |
| Ec-60 | " | A20898 | >100 | >100 | 1 |
| Kp-1 | *K. pneumoniae* D-11 |  | 0.4 | 0.2 | ½ |
| Kp-8 | " Type 22 | A20680 | >100 | >100 | — |
| Sm-1 | *Ser. narcescens* | A20019 | 12.5 | 3.1 | ¼ |
| Pa-1 | *Ps. aeruginosa* D-15 |  | 12.5 | 100 | 8 |
| Pa-3 | " | A9930 | 3.1 | 25 | 8 |
| Pa-4 | " H-9 |  | 50 | >100 | >2 |
| Pa-5 | " | A15150 | 25 | 100 | 4 |
| Pa-15 | " (GM-R) | A20717 | 25 | >100 | >4 |
| Pa-16 | " (GM-R) | A20718 | 25 | >100 | >4 |
| Pa-20 | " | A20325 | 12.5 | >100 | >8 |
| Pa-21 | " | A20601 | 25 | >100 | >4 |
| Pa-23 | " | A20741 | >100 | >100 | — |
| Px-10 | Ps. | A20621 | >100 | >100 | — |
| Pv-1 | *Pr. vulgaris* | A9436 | 1.6 | 0.8 | ½ |
| Pm-1 | *Pr. mirabilis* | A9554 | 3.1 | 1.6 | ½ |
| Pg-1 | *Pr. morganii* | A9553 | 3.1 | 1.6 | ½ |
| Sa-2 | *S. aureus* Smith | A15167 | 0.8 | 0.8 | 1 |
| Sa-4 | " FDA 209P |  | 6.3 | 3.1 | ½ |
| Sa-10 | " (KM-R) | A20239 | 6.3 | >100 | >16 |
| Sa-49 | " | A9553 | 50 | >100 | >2 |
| Bs-1 | *B. subtilis* PCI-219 |  | 0.8 | 0.8 | 1 |
| M6-1 | *Mycob.* 607 |  | 1.6 | 0.8 | ½ |
| M6-2 | " (KM-R) |  | >100 | — |  |
| M6-3 | " (KM,SM-R) |  | >100 | >100 | — |
| MP-1 | " *phlei* |  | 1.6 | 0.8 | ½ |
| Mr-1 | " *ranae* |  | 0.8 | 0.4 | ½ |

The above data show that compound 12 (BB-K 156) is equal to or superior in some respects to kanamycin A in its activity against a variety of disease organisms. It is particularly improved in its activity against *Pseudomonas aeruginosa*. In most instances, it is 2 to 4 fold as active as kanamycin A, and in some instances 8 to 16 times as active.

Compound 12 is valuable as an antibacterial agent, nutritional supplement in animal feeds, therapeutic agent in poultry and animals, including man, and are especially valuable in the treatment of infectious diseases caused by Gram-positive and Gram-negative bacteria.

Compounds 12 when administered orally is useful as an adjunctive treatment for preoperative sterilization of the bowel. Both aerobic and anaerobic flora which are suseptible to this drug is reduced in the large intestine. When accompanied by adequate mechanical cleansing, it is useful in preparing for colonic surgery.

Compound 12 is effective in the treatment of systemic bacterial infections when administered parenterally in the dosage range of about 250 mg. to about 3,000 mg. per day in divided doses three or four times a day. Generally the compound is effective when administered at a dosage of about 5.0 to 7.5 mg./kg. of body weight every 12 hours.

EXAMPLES

EXAMPLE 1

6'-N-Benzyloxycarbonyl-1,3,3''-N-triethoxycarbonylkanamycin (2)

To a stirred solution of 18.55 g (0.03 mole) of 6'-benzyloxycarbonylkanamycin A(1) and 8.33 g (0.08 mole) of Na carbonate in 300 ml of aq. acetone (1:1) was added dropwise 10.8 g (0.1 mole) of ethyl chloroformate at room temperature over 1.5 hours. The reaction mixture was allowed to stand overnight and then neutralized with 1 N HCl. The precipitated product was filtered, washed with 50 ml of water and dried to give 21.53 g (93%) of 2 which had no melting point and darkened over 290° C. IR(nujol): 3310, 1700 (sh), 1680, 1540, 1035 cm$^{-1}$. NMR(DMSO-d$_6$): $\delta$ in ppm, 1.17 (9H, m), 3.35 (6 H, m), 4.8 – 5.15 (2 H, m), 5.05 (2H, s), 7.37 (5 H, s).

Anal. Calcd. for $C_{35}H_{54}N_4O_{19} \cdot H_2O$: C, 49.29; H, 6.62; N, 6.57.

Found: C, 49.52; H, 6.73; N, 6.59.

EXAMPLE 2

1,3,3''-N-Triethoxycarbonylkanamycin A (3)

A solution of 4.9 g (6.37 m moles) of 2 in 170 ml of tetrahydrofuran (THF)-water (1 : 1) was hydrogenated overnight in the presence of 10% palladium on charcoal at room temperature. The catalyst was removed by filtration. The filtrate was evaporated in vacuo to a small volume to give precipitates, which were filtered and washed with a small amount of water to give 4.14 g (100%) of 3, m.p. >300°C. IR(nujol): 3320, 1685, 1035 cm$^{-1}$. NMR(DMSO-d ):$\delta$ in ppm, 1.0 – 1.3 (9 H).

EXAMPLE 3

1,3,3''-N-Triethoxycarbonylkanamycin A-4'-O-6'-N-cyclic carbamate (4)

To a stirred solution of 19.5 g (0.028 mole) of 3 and 1.83 g (0.0173 mole) of sodium carbonate in 450 ml of THF-water (1 : 1) was added dropwise 4.87 g (0.031 mole) of phenyl chloroformate at room temperature. The mixture was allowed to stir overnight, then the precipitated product was filtered and washed with 50 ml of cold water to give 16.96 g of 4. The filtrate and wash were evaporated in vacuo to dryness. The residue was triturated with 5 ml of cold water to give additional 2.02 g of 4. Total 18.98 g (93%). The analytical sample was prepared by crystallization from water-MeOH (8 : 2), m.p. >320° C. IR (nujol): 3300, 1715 (sh), 1700 (sh), 1675, 1035 cm$^{-1}$.

Anal. Calcd. for $C_{28}H_{46}N_4O_{18}$: C, 46.28; H, 6.38; N, 7.71.

Found: C, 45.95; H, 6.34; N, 7.20.

EXAMPLE 4

1,3,3''-N-Triethoxycarbonyl-4'',6''-O-isopropylidenekanamycin A-4'-O,6'-N-cyclic carbamate (5)

To a solution of 14.06 g (0.0194 mole) of 4 and 390 mg of p-toluenesulfonic acid in 270 ml of dry dimethylformamide (DMF) was added 5.8 g of 2,2-dimethoxypropane. The mixture was allowed to stand overnight at room temperature, then treated with 1 ml of triethylamine and evaporated to dryness in vacuo. The residue was triturated with 20 ml of water to give 13.05 g (88%) of 5, m.p. >300°C. IR (nujol): 3350, 1695, 1530, 1375, 1050 cm$^{-1}$.

Anal. Calcd. for $C_{31}H_{50}N_4O_{18}$: C, 48.51; H, 6.75; N, 7.31.

Found: C, 48.39; H, 6.81; N, 6.88.

EXAMPLE 5

1,3,3''-N-Triethoxycarbonyl-2',3'; 4'',6''-di-O-isopropylidenekanamycin A-4'-O-6'-N-cyclic carbamate (6)

A solution of 4.37 g (5.71 m moles) of 5, 100 mg of p-toluenesulfonic acid and 7.5 g of 2,2-dimethoxypropane in 100 ml of dry DMF was heated at 60° C for 30 mins. and then evaporated in vacuo until 20 ml of the distillate was obtained. The concentrate was again heated at 60°C for 30 mins. with additional 7.5 g of 2,2-diemthoxypropane and 40 mg of p-toluenesulfonic acid. The reaction mixture was treated with 200 mg of triethylamine and then evaporated to almost dryness in vacuo. The residue was triturated with 30 ml of benzene and then 50 ml of water to afford 4.0 g (87%) of 6, m.p. >300°C.

EXAMPLE 6

1,3,3''-N-Triethoxycarbonyl-2',3'; 4'',6''-di-O-isopropylidene-2''-O-tetrahydropyranylkanamycin A-4'-O, 6'-N-cyclic carbamate(7).

To a stirred solution of 403 mg (0.5 m mole) of 6 in 3 ml of dry DMF were added 3 ml of 2,3-dihydropyran and 12 mg of p-toluenesulfonic acid. The mixture was stirred for an hour then treated with 0.05 ml of triethylamine and evaporated to dryness in vacuo. The residue was triturated with water to give 480 mg (100%) of 7, m.p. >300° C.

EXAMPLE 7

1,3,3'',6'-N-Tetraethoxycarbonyl-2',3'; 4'',6''-di-O-isopropylidene-2''-O-tetrahydropyranylkanamycin A (8)

A solution of 290 mg (0.32 m mole) of 7 and 0.058 N sodium ethoxide in ethanol (15 ml) in 40 ml of dry DMF was refluxed for 15 mins., cooled to room temperature, neutralized with glacial acetic acid and concentrated in vacuo to 10 ml. The insoluble material was filtered off. The filtrate was evaporated in vacuo to 0.5 ml and the concentrate was dissolved in 30 ml of chloroform. The solution was chromatographed on 17 g of silica gel column with ethanol-chloroform (1 : 20) as eluant to give 174 mg (57%) of 8, m.p. 157° – 160° C. The analytical sample was prepared by reprecipitation from methanol-water, m.p. 160° – 163°C. IR(KBr): 3440, 3340, 1700, 1535, 1265, 1030 cm$^{-1}$.

Anal. Calcd. for $C_{41}H_{68}N_4O_{20}$: C, 52.55; H, 7.32; N, 5.92.

Found: C, 52.91; H, 7.57; N, 5.36.

EXAMPLE 8

1,3,3'',6'-N-Tetraethoxycarbonyl-2',3'; 4'', 6''-di-O-isopropylidene-4'-O-mesyl-2''-O-tetrahydropyranylkanamycin (9)

To a stirred solution of 1.09 g (1.15 m moles) of 8 in 11 ml of dry pyridine was added portionwise 393 mg. (3.43 m moles) of methanesulfonyl (mesyl) chloride at 5° C. The mixture was allowed to stand for 2.5 hours and concentrated in vacuo to 4 ml. The concentrate was poured into 50 ml of water. The resulting precipitates were filtered and washed with water to give 1.05 g (90%) of 9. The analytical sample was prepared by crystallization from water-methanol, m.p. 158° – 161° C. IR(KBr): 3460 – 3340, 1710, 1535, 1260, 1170 ($\nu SO_2$), 1040, 970 cm$^{-1}$. NMR (DMSO-d ): δ in ppm, 3.30 (3 H, s, $SO_2CH_3$).

Anal. Calcd. for $C_{42}H_{70}N_4O_{22}S$: C, 49.70; H, 6.95; N, 5.52.

Found: C, 49.74; H, 6.79; N, 4.82.

EXAMPLE 9

1,3,3''-6'-N-Tetraethoxycarbonyl-4'-iodokanamycin A (10)

A solution of 875 mg (0.849 m mole) of 9 and 1.75 g of sodium iodide in 50 ml dry acetone in a sealed tube was heated at 110° – 115°C for 9 hours, cooled to room temperature and evaporated to dryness in vacuo. The residue was dissolved in 50 ml of water and the solution was filtered to remove insoluble materials. The filtrate was passed through a column of carbon(20 ml), which was developed with 140 ml of water and then ethanol-water (2 : 1). The anthrone positive fractions were combined and evaporated in vacuo to yield 539 mg (72%) of (10). IR(KBr): 3420 – 3320, 1695, 1310, 1270, 1080, 1040 cm$^{-1}$.

EXAMPLE 10

4'-Deoxy-N-tetraethoxycarbonylkanamycin A (11)

A solution of 539 mg (0.612 m mole) of 10 and 190 mg of triethylamine in water-THF was hydrogenated overnight with 370 mg of 10% palladium on charcoal at room temperature. The catalyst was filtered off. The filtrate was evaporated in vacuo to a small volume to precipitate 11, which was filtered and washed with ice-cold water to give 220 mg of 11. The filtrate was adsorbed on a column of carbon (10 ml), which was eluted with water and water-ethanol. Evaporation of the anthrone-positive fraction gave 243 mg of additional 11. Total 463 mg (100%).

EXAMPLE 11

BB-K 156, [4'-Deoxykanamycin A (12)].

A mixture of 495 mg (0.654 m mole) of 11 and 4.17 g of barium hydroxide octahydrate in 30 ml of water-dioxane (5: 4) was heated at reflux with stirring for 4.5 hours. The mixture was neutralized with dil $H_2SO_4$ and filtered to remove the inorganic salt. The filtrate was evaporated in vacuo which showed Rf 0.36, 0.47, 0.60 (main, 4'-deoxy-KMA), 0.71, 0.77 by TLC (thin layer chromatography) a silica gel plate (S-110, ninhydrin). The residue in 10 ml of water was passed through a column of CG-50 ($NH_4^+$, 14 ml), which was washed with 100 ml of water and then eluted with 600 ml of 0.1 – 0.5 N $NH_4CH$ with linear increase in concentration. The eluate was collected in 10-ml fraction. Tube nos 37–46 showing a major spot at 0.60 with two minor spots by TLC on a silica gel plate (S-110) were combined, evaporated in vacuo and lyophilized to give 59 mg (19%) of 4'-deoxykanamycin 12, which was further purified on a two-bed column of CG-50 (top: cupraammonium or, 2.5 ml; bottom; $NH_4^+$, 0.8 ml) to give 21 mg of the pure sample, Rf 0.60 (S-110, ninhydrin), m.p. 190°–191°C (dec). IR(KBr): 1575, 1480, 1340, 1135, 1030 cm$^{-1}$.

Anal. Calcd. for $C_{18}H_{36}N_4O_{10}2H_2CO_3$: C, 40.54; H, 6.80; N, 9.46.

Found: C, 41.50; H, 6.14; N, 9.35.

Amberlite CG 50 is the tradename for the chromatographic grade of a weakly acidic cationic exchange resin of a carboxylic-polymethacrylic type.

Thin layer chromatography (TLC) system S-110 employs a silica plate and a solvent system of $CHCl_3$-MeOH-28% $NH_4OH$-$H_2O$ (1:4:2:1).

EXAMPLE 12

6'-N-Benzyloxycarbonyl-N,O-nonaacetylkanamycin A (13)

To a stirred suspension of 5.0 g (0.008 mole) of 6'-N-Cbz-kanamycin in 50 ml of dry pyridine was added 15 ml (0.159 mole) of acetic anhydride at ambient temperature. The temperature rose to 40° C. When the exothermic reaction subsided, the reaction mixture was stirred for 3 hours at 50°C, stood overnight and evaporated in vacuo. The residue was co-evaporated with ethyl acetate several times to give a powder, which was refluxed with 150 ml of tetrahydrofuran (THF) for 20 minutes. The insoluble material (3.6 g) was filtered and the filtrate was concentrated in vacuo to the one third volume to give the precipitate (3.35 g), which was identical with the insoluble material by IR spectroscopy and TLC; Rf 0.64 (main), EtOAc-EtOH (2 : 1). The insoluble material and the precipitate were combined and crystallized from EtOH to give 5.18 g (66%) of crystalline 13, m.p. 168°C (dec). IR(KBr): 1730, 1650 cm$^{-1}$. $[\alpha]_D^{19.5}$ + 106.2°C (C 2.5, MeOH).

Anal. Calcd. for $C_{44}H_{60}N_4O_{22}\cdot H_2O$: C, 52.07; H, 6.16; N, 5.52.

Found: C, 52.28; H, 6.08; N, 5.47.

EXAMPLE 13

1,2',2'',3,3',3'',4'',6',6''-N,O-Nonaacetylkanamycin A (14)

A solution of 12.5 g (12.7 m moles) of 13 in 150 ml of methanol and 12 ml of acetic acid was hydrogenated overnight with 1.5 g of 10% palladium carbon at atmospheric pressure and room temperature. The catalyst was removed by filtration and the filtrate was evaporated in vacuo. The residue was co-evaporated three times with ethanol and ethyl acetate to give a solid which was triturated with ethyl acetate, filtered off and washed with ethyl acetate. The crude powder (9.7 g) was crystallized from 80 ml of 95% ethanol and 100 ml of ethyl acetate to give 9.30 g (85%) of 14, m.p. 210° – 213° C. IR(KBr): 3275, 1720, 1620, 1550, 1430, 1370, 1230, 1030, cm$^{-1}$.

Anal. Calcd. for $C_{36}H_{54}N_4O_{20} \cdot 2H_2O$: C, 48.10; H, 6.50; N, 6.23.
Found: C, 48.15, 48.22; H, 6.20, 6.33: N, 6.14, 6.15.

EXAMPLE 14

4'-O-Mesyl-1,2',2'',3,3',3'',4'',6',6''-N,O-nonaacetylakanamycin A (15)

A solution of 1.0 g (1.16 m moles) of 14 in 10 ml of pyridine was evaporated in vacuo to remove the solvated water. The residue was dissolved in 10 ml of pyridine. The solution was chilled to 0°C and treated with 200 mg (1.74 m moles) of methanesulfonyl chloride. The mixture was allowed to stand at 0°C for an hour and then at room temperature for 2 hours, treated with a drop of water and evaporated in vacuo. The residue was treated with 5 ml of water and shaken with four 5-ml portions of water-saturated butanol. The butanol extracts were combined, washed with two 2-ml portions of water and evaporated in vacuo to give a powder, which was washed with ethyl acetate and dried to give 699 mg (64%) of 15, m.p. 217° – 220°C. IR(KBr): 1740, 1650, 1540, 1430, 1370, 1230, 1170, 1030, 820, 740 cm$^{-1}$.

Anal. Calcd. for $C_{37}H_{56}N_4O_{22}S \cdot 3/2H_2O$: C, 45.91; H, 6.14; N, 5.79; S, 3.31.
Found: C, 45.82; H, 6.08; N, 5.54; S, 3.85.

EXAMPLE 15

4'-Epi-thioacetyl-1,2',2'',3,3',3'',4'',6',6''-N,O-nonaacetylkanamycin A (16)

A mixture of 100 mg (0.106 m mole) of 15 and 60 mg (0.5 m mole) of potassium thiolacetate in 1 ml of dry DMF was heated at 110° C for 2 hours. The reaction mixture was dried up in vacuo. The residue was dissolved in 2 ml of water. The solution was shaken with four 2-ml portions of water-saturated butanol. The combined butanol extracts were washed with two 1-ml portions of water and evaporated in vacuo. The residue was dissolved in 1 ml of ethanol and adsorbed on the column of silica gel (7 g), which was developed with 200 ml of EtOAc and then 500 ml of EtOAc-EtOH (5 : 1). The eluate was collected in 10-ml fractions. Tube nos 32 – 45 which showed Rf at 0.64 (red color with anthrone-H$_2$SO$_4$ spray reagent) by TLC on a silica gel plate (EtOAc-EtOH, 1 : 2) were combined and evaporated in vacuo to give 22 mg (23%) of 16, m.p. 198° – 203°C. IR(KBr): 1740, 1650, 1540, 1430, 1370, 1235, 1120, 1030 cm$^{-1}$.

Anal. Calcd. for $C_{38}H_{56}N_4O_{20}S \cdot 3/2H_2O$: C, 48.15; H, 6.27; N, 5.91; S. 3.38.
Found: C, 48.19; H, 5.94; N, 5.13; S, 3.25.

EXAMPLE 16

BB-K 156, 4'-Deoxykanamycin A (12)

A solution of 90 mg (0.098 m mole) of 16 in 20 ml of ethanol was refluxed with ca 1 g of Raney nickel for 2 hours. The catalyst was filtered off, washed with ethanol and then with water. The filtrate and wash were evaporated to dryness in vacuo. The residual solid in 2 ml of 80% hydrazine hydrate in a sealed tybe was heated at 130° C for 60 hours. The reaction mixture was evaporated in vacuo and the residue was co-evaporated in vacuo with water. The residue in 2 ml of water was adjusted to pH 6 with 1 N hydrochloric acid and passed through a column of CG-50 (NH$_4^+$, 10 ml), which was washed with 50 ml of water and then eluted stepwise with 300 ml of 0.1 N NH$_4$OH and 500 ml of 0.2 N NH$_4$OH. The eluate was collected in 10-ml fractions, and divided into the following fractions on the basis of TLC on a silica get plate (S-110, ninhydrin). Each fraction was evaporated in vacuo and lyophilized.

| Fraction | Tube nos | Eluant | Weight | Rf (S-110) | Identification |
|---|---|---|---|---|---|
| 1 | 5 – 12 | 0.1 N NH$_4$OH | 5 mg | 0.65 | unidentified product* |
| 2 | 31 | 0.2 N NH$_4$OH | 8 mg (18%) | 0.60 | 4'-deoxy-KM |
| 3 | 32 – 33 | 0.2 N NH$_4$OH | 7 mg | 0.37 0.60 | 4'-epi KM + 4'-deoxy KM |

*This product shows an amide absorption at 1630 cm$^{-1}$ in its ir spectrum.

EXAMPLE 17

Preparation of 6'-Carbobenzoxykanamycin A

A solution of 42.5 g. (90 mmoles) of kanamycin A free base in 450 ml. of water and 500 ml. of dimethylformamide (DMF) was cooled below 0°C. and stirred vigorously. To the solution was added dropwise over a period of about two hours a solution of 22.4 g. (90 mmole) of N-(benzyloxycarbonyloxy)succinimide in 500 ml. of DMF. The mixture was stirred at −10° to 0°C. overnight and then at room temperature for one day. The reaction mixture was evaporated under reduced pressure below about 50°C. The oily residue was dissolved in a mixture of 500 ml. water and 500 ml. butanol, the mixture being filtered to remove insoluble material and separated into two layers. The butanol and aqueous layers were treated with butanol-saturated water (500 ml. X 2) and water-saturated butanol (500 ml. X 2), respectively, using a technique similar to counter current distribution. The three aqueous layers were combined and evaporated to dryness under reduced pressure to give an oily residue, a part of which crystallized on standing at room temperature. To the residue including the crystals was added about 100 ml. of methanol, which dissolved the oil and separated it from the crystals. After adding about 300 ml. of ethanol, the mixture was kept at room temperature overnight to give a crystalline mass which was collected by filtration. It weighed 44 g. The product contained a small amount of kanamycin A as indicated by thin layer chromatography using n-propanol-pyridine-acetic acid-water (15:10:3:12) as the solvent system and ninhydrin as the spray reagent.

The crude product was dissolved in 300 ml. of water and chromatographed on a column (30 mm. diameter) of CG-50 ion-exchange resin (NH$_4^+$ type, 500 ml.).

The column was irrigated with 0.1 N ammonium hydroxide solution and the eluate was collected in 10-ml fraction. The desired product was contained in tube numbers 10-100, while kanamycin A recovered from slower-moving fractions and the position isomer(s) of the product seemed to be contained in the faster-moving fractions. The fractions 10-110 were combined and evaporated to dryness under reduced pressure to give 24.6 g. (45%) of a colorless product 6-carbobenzoxykanamycin A (II) [6'-Cbz-kanamycin A], which began to melt and color at 204° C. and decomposed at 212° C. with gas evolution. $[\alpha]_D$ +106° ($c$=2, $H_2O$).

| TLC (silica gel $F_{254}$; ninhydrin | Rf value | |
|---|---|---|
| Solvent System | 6'Cbz-Kanamycin | Kanamycin A |
| n-PrOH-Pyridine-AcOH-$H_2O$ (15:10:3:12) | 0.42 0.33 0.15 (main) minor | 0.04 |
| Acetone-AcOH-$H_2O$ (20:6:74) | 0.24 | 0.14 |
| $CHCl_3$-MeOH-c.NH OH-$H_2O$ (1:4:2:1) | 0.76 | 0.50 |
| AcOMe-n-PrOH-c.$NH_4OH$ (45:105:60) | 0.22* | 0.04* |

*Detected by anthrone-sulfuric acid.

The final product was found to be accompanied by two minor components by TLC with one of the solvent systems tested. However, the final product was used without further purification for the preparation of BB-K156(12).

EXAMPLE 18

Preparation of the monosulfate salt of 4'-deoxykanamycin A(12).

One mole of 4'-deoxykanamycin A is dissolved in 1 to 3 liters of water. The solution is filtered to remove any undissolved solids. To the chilled and stirred solution is added one mole of sulfuric acid dissolved in 500 ml. of water. The mixture is allowed to stir for 30 minutes, following which cold ethanol is added to the mixture till precipitation occurs. The solids are collected by filtration and are determined to be the desired monosulfate salt.

EXAMPLE 20

Preparation of Disulfate Salt of 4'-deoxykanamycin A(12)

Thirty-five grams of 4'-deoxykanamycin A is dissolved in 125 ml. of deionized water. The pH is adjusted to 7-7.5 with 50% V/V sulfuric acid.

Eight and one half grams of Darco G-60 (activated charcoal) is added and the mixture is slurried at ambient room temperature for 0.5 hour. The carbon is removed by suitable filtration and washed with 40 ml. of water. The water wash is added to the filtrate.

The combined filtrate-wash above is adjusted to pH 2-2.6 with 50% V/V sulfuric acid.

Eight and one half grams of Darco G-60 is added to the solution. The mixture is slurried for 0.5 hour at ambient room temperature. The carbon is removed by suitable filtration and washed with 35 ml. of deionized water. The water is added to the filtrate.

The combined filtrate-wash is adjusted to pH 1-1.3 with 50% V/V sulfuric acid. This solution is added with rapid stirring over a 10 minute period to 600-800 ml. of methanol (3-4 volumes of methanol). The mixture is stirred for 5 minutes at pH 1-1.3, passed through a 100 mesh screen, stirred for 2 minutes and allowed to settle for 5 minutes. Most of the supernatant is decanted. The remaining slurry is suitably filtered, washed with 200 ml. of methanol and vacuum dried at 50° C. for 24 hours to yield the desired disulfate salt of 12.

We claim:
1. The compound having the formula

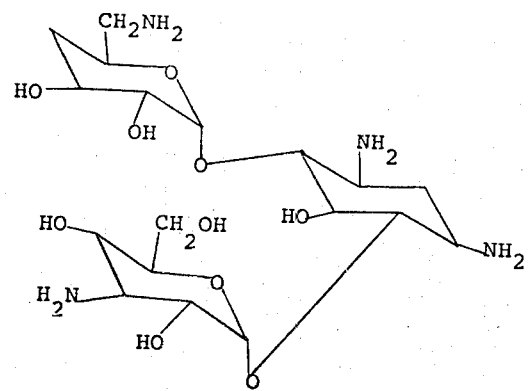

or a pharmaceutically acceptable nontoxic salt thereof.
2. The mono- or disulfate salt of the compound of claim 1.

* * * * *